(12) United States Patent
Allen et al.

(10) Patent No.: US 6,644,525 B1
(45) Date of Patent: Nov. 11, 2003

(54) HITCH RACK

(75) Inventors: Alexander R. Allen, Bolton, MA (US); Richard A. Allen, Concord, MA (US)

(73) Assignee: R. A. Allen Company, Inc., New Bedford, MA (US)

( * ) Notice: Subject to any disclaimer, the term of this patent is extended or adjusted under 35 U.S.C. 154(b) by 94 days.

(21) Appl. No.: 10/059,761

(22) Filed: Jan. 29, 2002

(51) Int. Cl.$^7$ .................................................. B60R 9/00
(52) U.S. Cl. ........................ 224/497; 224/282; 224/506; 224/510; 224/519; 224/532; 224/536; 224/924
(58) Field of Search ................................. 224/282, 497, 224/499, 502, 503, 504, 505, 506, 507, 508, 510, 519, 523, 524, 532, 536, 537, 924; 414/462

(56) References Cited

U.S. PATENT DOCUMENTS

| | | | | |
|---|---|---|---|---|
| 5,449,101 A | | 9/1995 | Van Dusen | |
| 5,529,231 A | * | 6/1996 | Burgess | 224/502 |
| 5,615,904 A | * | 4/1997 | Van Dusen et al. | 280/506 |
| 5,662,256 A | * | 9/1997 | Bryan | 224/523 |
| 5,950,891 A | * | 9/1999 | Brungardt et al. | 224/497 |
| 6,085,954 A | * | 7/2000 | Bloemer et al. | 224/509 |
| 6,123,498 A | * | 9/2000 | Surkin | 414/462 |
| 6,234,372 B1 | * | 5/2001 | Rivera | 224/536 |
| 6,336,580 B1 | * | 1/2002 | Allen et al. | 224/532 |
| 6,443,345 B1 | * | 9/2002 | Bloemer et al. | 224/519 |
| 6,547,116 B2 | * | 4/2003 | Anderson et al. | 224/536 |

\* cited by examiner

Primary Examiner—Stephen K. Cronin
(74) Attorney, Agent, or Firm—Herbert L. Bello (57) ABSTRACT

A collapsible bicycle carrier has a base that is configured to fit a trailer hitch receiver on a motor vehicle. An upright frame is operatively connected to the base. A T-shaped member having a vertical upright body and a horizontal crossbar is connected to the frame. A substantially U-shaped carrying assembly having a pair of carrying arms at an open end thereof is pivotally mounted to the crossbar. A slide having a tab is slidably received on the upright body. A bracket is rotatably mounted at its ends to the tab and a closed end of the carrying assembly. A lock is provided on the slide for locking the slide in first and second positions. The carrying arms are in an extended carrying position when the slide is locked in the first position and in a collapsed position when the slide is locked in the second position.

23 Claims, 6 Drawing Sheets

HITCH RACK

BACKGROUND OF THE INVENTION

1. Field of the Invention

The present invention relates to carriers that are configured to be attached to motor vehicles, and, more particularly, the invention is directed toward a bicycle carrier that is mounted to a motor vehicle trailer hitch receiver.

2. Description of the Prior Art

A variety of bicycle carriers that are configured to be mounted to motor vehicles by means of trailer hitch receivers are available in the prior art. Examples of carriers that are attachable to trailer hitch receivers are shown in U.S. Pat. Nos. 5,190,195 and 6,206,259.

Bicycle racks, which may be detachably secured to a conventional trailer hitch mounted on a passenger vehicle, typically employ a rectangular base tube that is received in the trailer hitch receiver mounted on a passenger vehicle. A T-shaped bar is secured to and extends upwardly from the base tube. A pair of carrying members is mounted on the top of the T-shaped bar to carry one or more bicycles. Such carriers have been met with varying degrees of success because they are cumbersome to use and store. Other trailer hitch mountable carriers suffer from the limitation that it is difficult to securely fasten the bicycles to the carrier and stop unwanted movement of the carrying member when bicycles are secured thereon.

A need has arisen for an improved, collapsible bicycle carrier that is capable of being conveniently mounted to a trailer hitch receiver that is secured to a motor vehicle.

SUMMARY OF THE INVENTION

It is an object of the present invention to provide a bicycle carrier that does not suffer from the disadvantages and limitations of prior art bicycle carriers.

According to a preferred embodiment of the invention, a collapsible bicycle carrier that is configured to be detachably mounted to a trailer hitch receiver includes a generally horizontal base member that is sized and shaped to be snugly received in the trailer hitch receiver. A frame member is pivotally mounted to the base member. A pin assembly is provided for locking the frame in a generally vertical position, the frame member being movable when the pin is removed.

A generally T-shaped member having a generally vertical upright body and a generally horizontal cross member is secured to an upper end of the upright body. The vertical body is attached to the frame member. A substantially U-shaped carrying arm assembly is rotatably attached at opposite ends of the cross member. The carrying arm assembly has a pair of carrying arms at a forward end for carrying bicycles, for example, and the rear end of the carrying arm assembly is generally U-shaped. A slide member having a tab is constrained for slidable movement on the upright body. One end of an elongated bracket is mounted to the rear end of the carrying arm assembly, the other end of the bracket being mounted to the slide member tab. The carrying arm assembly and the slide member are pivotally movable relative to the elongated bracket. As the slide member moves between an upper position and a lower position on the upright member, the carrying arm assembly moves from a collapsed position to a substantially horizontal position. A pin assembly is provided for locking the slide in its upper and lower positions.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein.

DETAILED DESCRIPTION OF THE PREFERRED EMBODIMENTS

Figure 1:
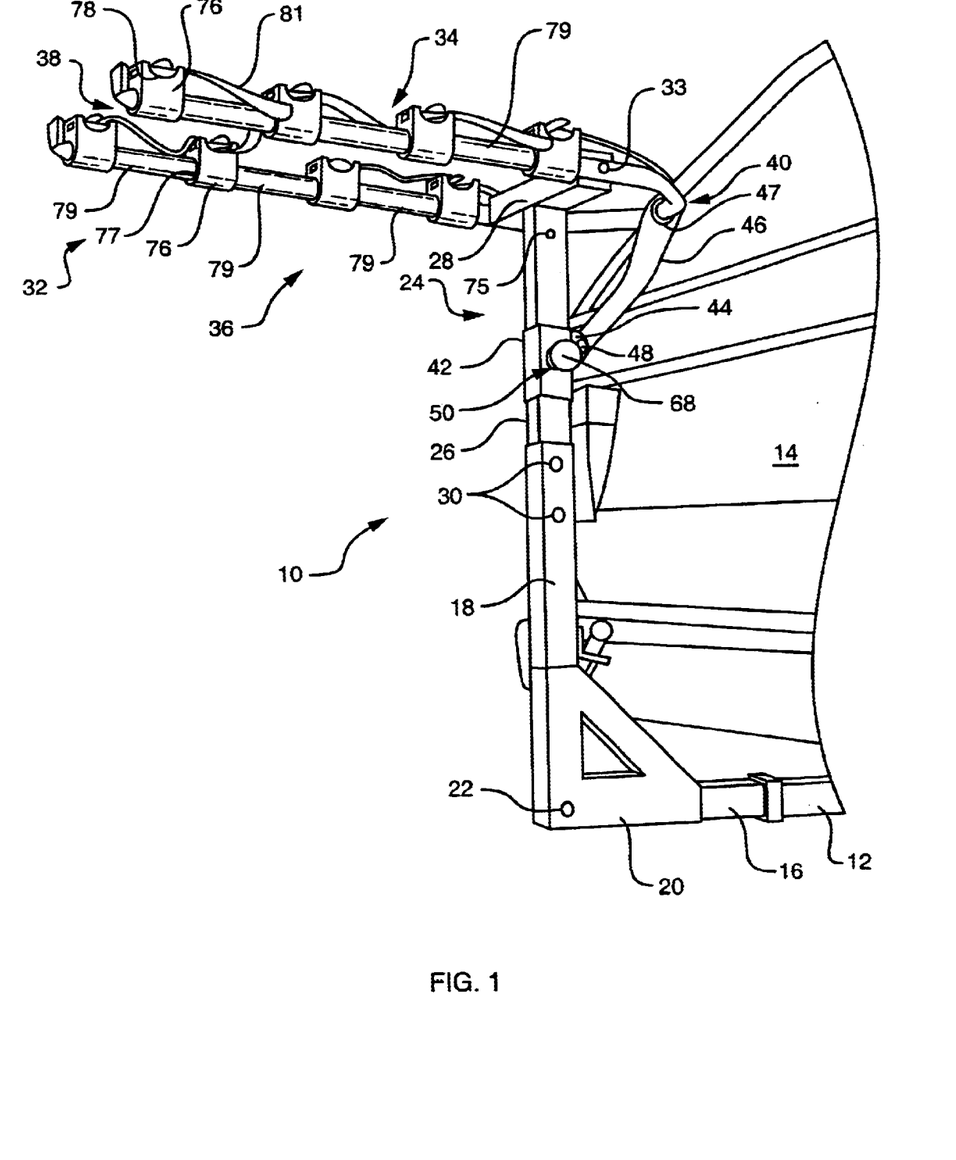
FIG. 1 is a perspective view of a carrier embodying the invention in a fully extended carrying position.
Figure 2:
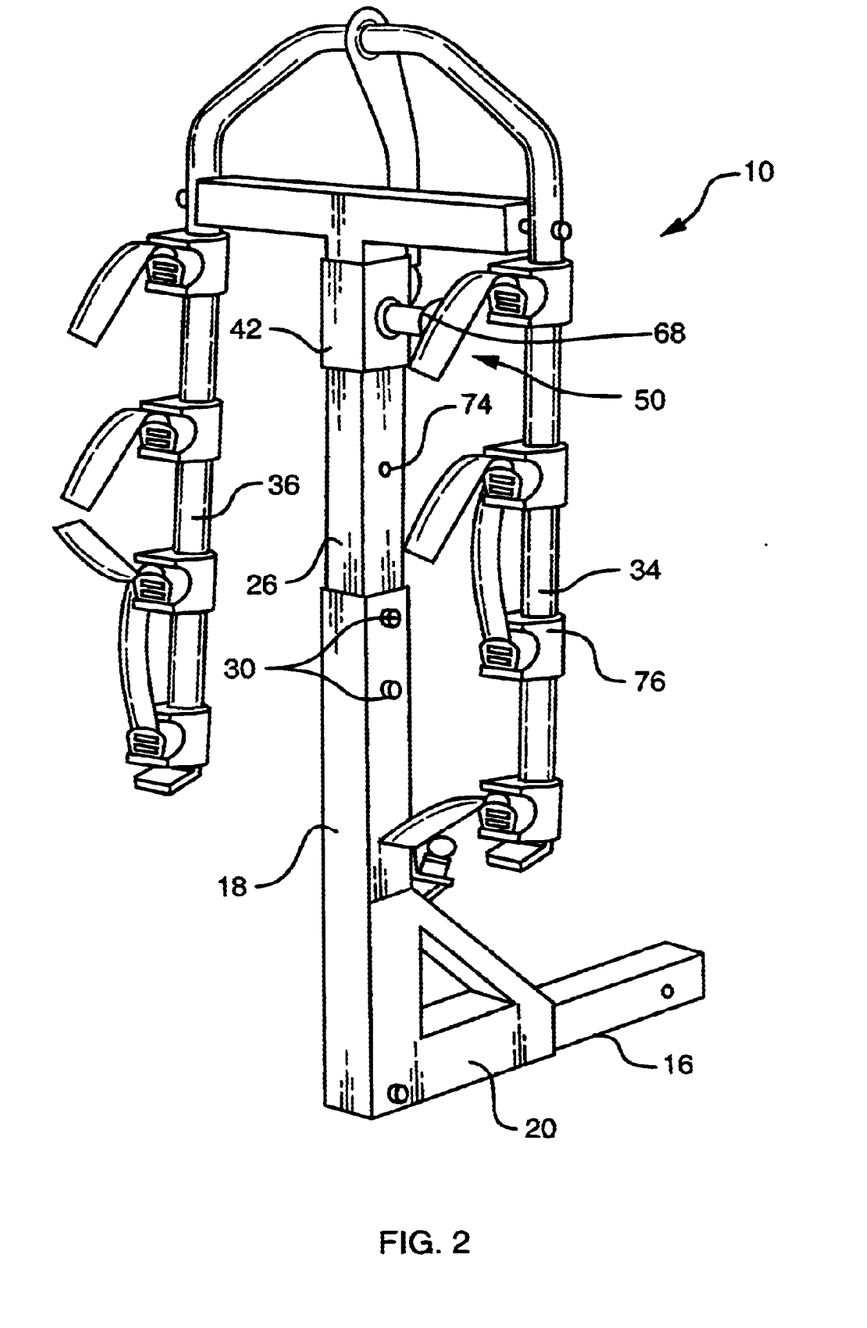
FIG. 2 is a perspective view of the carrier of FIG. 1 in a collapsed position.

Referring now to the drawings, particularly FIGS. 1 and 2, there is shown a collapsible carrier 10, for example, a bicycle carrier or rack, that is configured to be detachably mounted to a trailer hitch receiver 12 that is mounted to a vehicle 14. Bicycle rack 10 includes a generally horizontal base 16 that is sized and shaped to be snugly received in trailer hitch receiver 12.

A frame member 18 is pivotally mounted to a bracket 20, for example, a right angle bracket, that is attached to horizontal base 16. Frame member 18 is pivotally mounted to horizontal base 16 by means of a fastening assembly 22, for example, a nut and bolt assembly. A generally T-shaped member 24 having a generally vertical upright body 26 and a generally horizontal cross member 28 is secured to an upper end of the upright body. A lower end section of upright body 26 is secured to frame member 18 by means of fastening assemblies 30, for example, nut and bolt assemblies.

A substantially U-shaped carrying arm assembly 32 is rotatably attached at opposite ends of the cross member 28 by means of a bolt 33, for example. Carrying arm assembly 32 has a pair of carrying arms 34, 36 at a forward end 38 for carrying bicycles, for example. A rear end 40 of u carrying arm assembly 32 is generally U-shaped. A slide member 42 having a tab 44 is constrained for slidable movement on upright body 26. One end of an elongated bracket 46 is formed with a through hole 47 which is sized and shaped to loosely receive rear end 40 of carrying arm assembly 32. The other end of bracket 46 is mounted to tab 44 by means of a pin assembly or a nut and bolt assembly 48, for example. Bracket 46 is pivotally movable relative to tab 44 and pivotally movable relative to carrying arm assembly 32.

As slide member 42 slides on upright member 26 between an upper position shown in FIG. 2 and a lower position shown in FIG. 1, the carrying arm assembly 32 moves from a collapsed position (FIG. 2) to a substantially horizontal extended carrying position (FIG. 1). A locking pin assembly 50, shown in detail in FIG. 5, is provided for locking carrying arm assembly 32 in its collapsed and extended positions.

Figure 5:
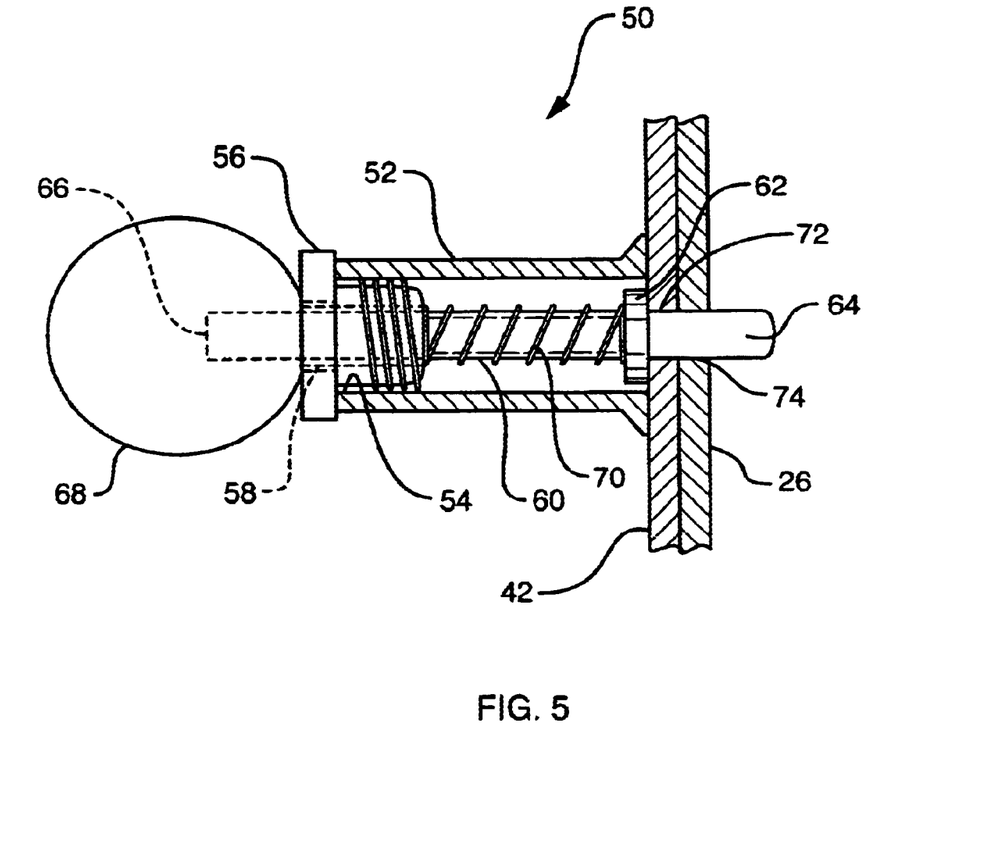
FIG. 5 is a perspective view of the pin assembly for locking the carrier of FIG. 1 in its extended and collapsed positions.

Referring now to FIG. 5, it will be seen that locking pin assembly 50 includes a body 52, one end of which is attached to slide member 42 by welding, for example. The other end of body 52 is internally threaded at 54. A cap assembly 56 is threaded on body 52, the cap assembly having a through hole 58 which receives a rod 60 that is formed with an enlarged ring 62 adjacent an end 64. An end 66 of rod 60 is secured in a knob 68. A spring 70 that is disposed about rod 60 is held between cap assembly 56 and ring 62. As shown in FIG. 5, end 64 of rod 60 is received in holes 72 and 74 formed in slide member 42 and upright body 26, respectively. Accordingly, slide member 42 and upright body 26 are locked against relative movement. When knob 68 is pulled away from body 52, spring 70 is compressed and end 64 of rod 60 disengages upright body 26. Accordingly, slide member 42 is movable relative to upright body 26. A hole 74, formed in upright body 26 (FIG. 2), is provided for locking carrying arm assembly 32 in its extended position. A hole 75, formed in upright body 26 (FIG. 1), is provided for locking carrying arm assembly 32 in its collapsed position as shown in FIG. 2.

A plurality of holding devices 76 having a hole 77 are attached to carrying arms 34 and 36. Each holding device 76 is formed with a substantially U-shaped channel 78 that is sized and shaped to receive a bicycle frame (not shown) that is positioned on carrying arms 34 and 36. A sleeve 79 is provided between adjacent holding devices 76 for keeping adjacent holding devices spaced apart. A strap assembly 81, that is attached to each holding device 76, is provided for securing the bicycle frame to holding devices 76.

Figure 3:
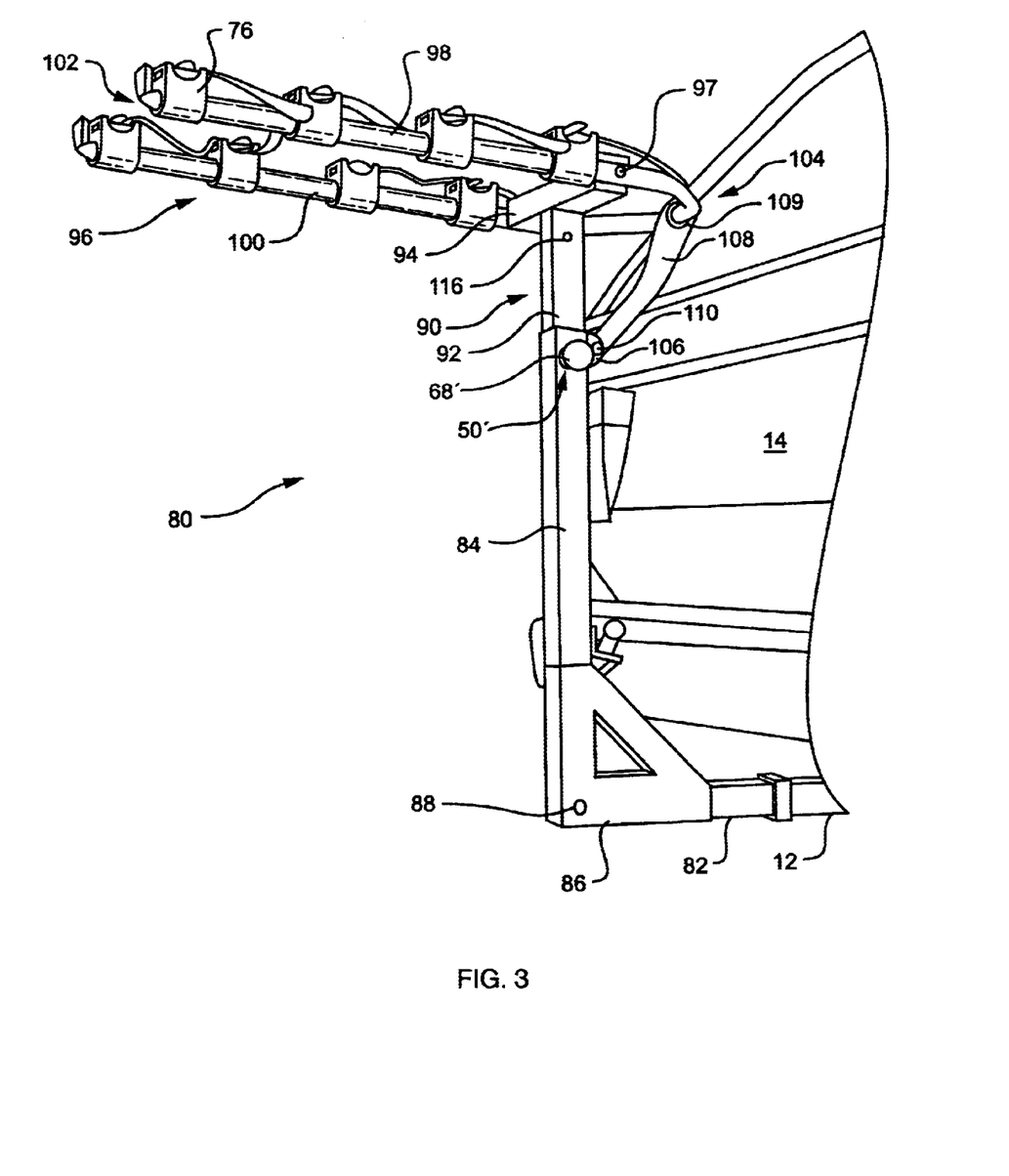
FIG. 3 is a perspective view of an alternate embodiment of the carrier of the present invention in its fully extended carrying position.
Figure 4:
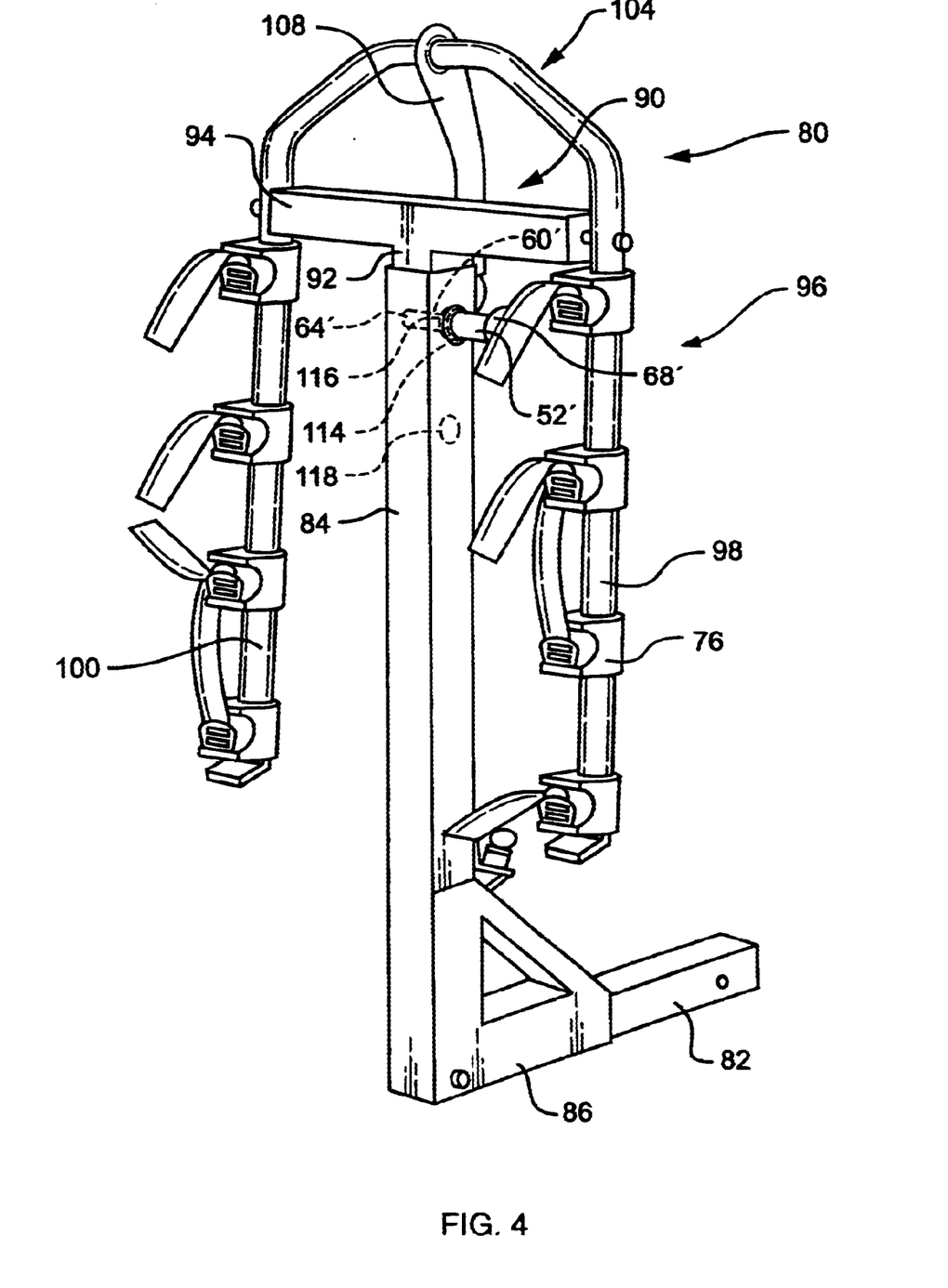
FIG. 4 is a perspective view of the carrier of FIG. 3 in its collapsed position.

Referring now to FIGS. 3 and 4, there is shown an alternate embodiment of the invention in the form of a collapsible carrier 80, for example, a bicycle carrier or rack, that is configured to be detachably mounted to trailer hitch receiver 12 that is mounted to vehicle 14. Bicycle rack 80 includes a generally horizontal base 82 that is sized and shaped to be snugly received in trailer hitch receiver 12.

A frame member 84 is pivotally mounted to a bracket 86, for example, a right angle bracket, that is attached to horizontal base 82. Frame member 84 is pivotally mounted to horizontal base 82 by means of a fastening assembly 88, for example, a nut and bolt assembly. A generally T-shaped member 90 having a generally vertical upright body 92 and a generally horizontal cross member 94 is secured to an upper end of the upright body 92. Upright body 92 is sized and shaped to be slidably received in frame member 84.

A substantially U-shaped carrying arm assembly 96 is rotatably attached at opposite ends of cross member 94 by means of a bolt 97, for example. Carrying arm assembly 96 has a pair of carrying arms 98, 100 at a forward end 102 for carrying bicycles, for example. A rear end 104 of carrying arm assembly 96 is generally U-shaped. A tab 106 is provided on frame member 84 at an upper end thereof. One end of an elongated bracket 108 is formed with a through hole 109 that is sized and shaped to loosely receive rear end 104 of carrying arm assembly 96. The other end of bracket 108 is mounted to tab 106 by means of a pin assembly or a nut and bolt assembly 110, for example. Bracket 108 is pivotally movable relative to tab 106 and pivotally movable relative to carrying arm assembly 96.

As upright body 92 slidably moves in frame member 84 between an upper position shown in FIG. 3 and a lower position shown in FIG. 4, carrying arm assembly 96 moves from a substantially horizontal extended carrying position (FIG. 3) to a collapsed position (FIG. 4). A locking pin assembly 50', which is identical to locking pin assembly 50 in structure and function, is provided for locking carrying arm assembly 96 in its collapsed and extended positions. Corresponding elements of locking pin assembly 50 and locking pin assembly 50' are distinguished by a prime notation.

When end 64' of rod 60' is received in holes 114 and 116 that are formed in frame member 84 and upright body 92, respectively, frame member 84 and upright body 92 are locked against relative movement. When knob 68' is pulled away from body 52', spring 70' (not shown) is compressed and end 64' of rod 60' disengages upright body 92. Accordingly, upright body 92 is movable relative to frame member 84. As shown in FIG. 4, hole 116 is provided for locking carrying arm assembly 96 in its collapsed position. A hole 118 that is formed in upright body 92 (FIG. 4) is provided for locking carrying arm assembly 96 in its extended position as shown in FIG. 3.

Figure 6:
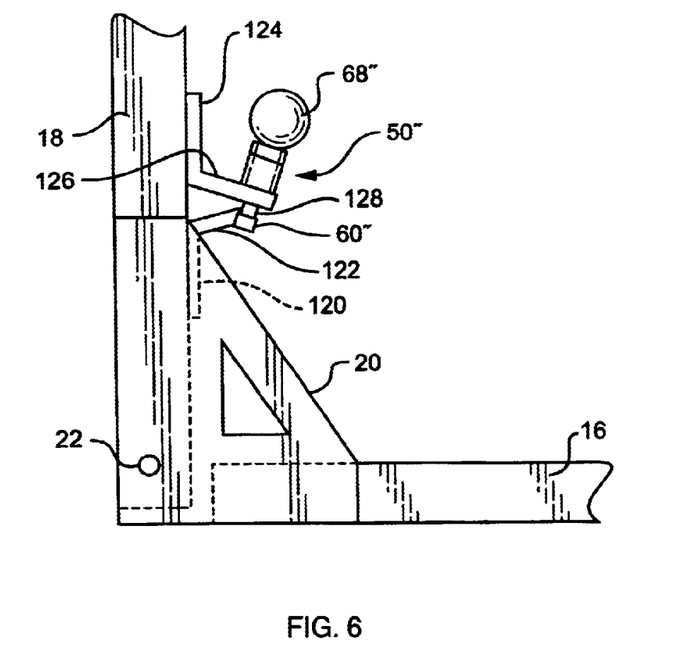
FIG. 6 is a side elevation showing the tilting feature of the carrier of FIG. 1.

As previously indicated, frame member 18 is pivotally mounted to horizontal base 16. In certain instances, it is desirable to tilt frame member 18 away from vehicle 14. In FIG. 6, frame member 18 is locked in its vertical position and, in FIG. 7, frame member 18 is in its tilted position.

Figure 7:
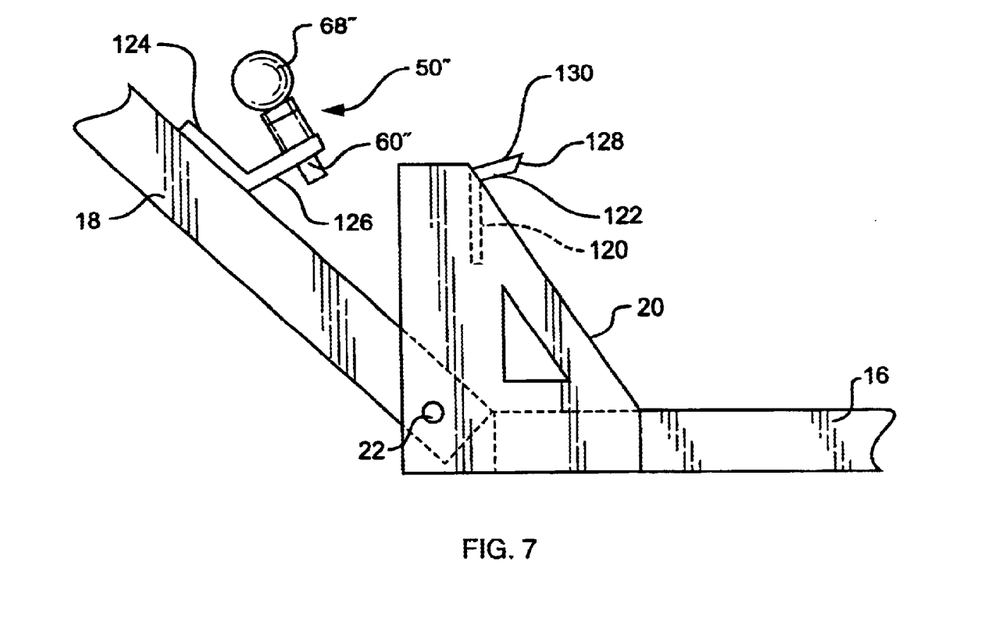
FIG. 7 is a side elevation showing the carrier of FIG. 1 in its tilted position.

As shown in FIG. 6, a substantially L-shaped bracket 120 is attached to bracket 20. In the illustrated embodiment, bracket 120 is welded to bracket 20. A leg 122 of bracket 120 extends rearwardly from frame member 18. A substantially L-shaped bracket 124 is attached to frame member 18. In the illustrated embodiment, bracket 124 is welded to frame member 18. A leg 126 of bracket 124 extends rearwardly from frame member 18. A locking pin assembly 50", which is identical to locking pin assembly 50, is attached to leg 126. Corresponding elements of locking pin assembly 50 and locking pin assembly 50" are distinguishable by a double prime notation. When frame member 18 is in its locked upright position, rod 60" is in engagement with an end 128 of leg 122. In order to release frame member 18, knob 68" is pulled upwardly. Rod 60" disengages end 128 of leg 122 and frame member 18 is free to tilt forwardly as shown in FIG. 7. When frame member 18 is moved from its tilted position to its locked upright position shown in FIG. 6, rod 60" bears against an upper surface 130 of leg 122 and is pressed inwardly against spring 70" (not shown). Rod 60" slides along upper surface 130 as frame member 18 continues to move toward its upright position. When rod 60" travels beyond end 128 of leg 122, spring 70" (not shown) urges rod 60" to its fully extended position in locked engagement with end 128.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A collapsible carrier detachably mountable to a trailer hitch receiver that is secured to a vehicle, said collapsible carrier comprising:

(a) a base that is sized and shaped to be detachably mounted to the trailer hitch receiver;

(b) a frame mounted to said base, said frame extending upwardly from said base in a substantially vertical position;

(c) a carrying assembly pivotally mounted to said frame, said carrying assembly having a forwardly extending carrying means and a rearwardly extending bracket engaging member;

(d) a slide member slidably mounted on said frame;

(e) a tab provided on said slide member;

(f) a bracket having first and second ends, said first end of said bracket is pivotally mounted to said tab, said second end of said bracket is pivotally mounted to said bracket engaging member; and (g) means for locking said slide member at first and second positions on said frame, said carrying means in a substantially horizontal extended carrying position when said slide member is locked in said first position, said carrying means in a collapsed position when said slide member is locked in said second position.

2. The collapsible carrier as claimed in claim 1 wherein said frame includes a first member and a second member, said first member being an upright, a lower end of said upright being operatively connected to said base, said second member being a substantially T-shaped member having a substantially vertical body and a substantially horizontal cross member, said cross member attached to an upper end of said body, a lower end of said body operatively connected to an upper end of said upright.

3. The collapsible carrier as claimed in claim 2 wherein said carrying assembly is a substantially U-shaped member and said carrying means has a pair of extending carrying arms, said carrying arms forming an open end of said U-shaped carrying assembly, said bracket engaging member being positioned at a closed end of said U-shaped carrying assembly.

4. The collapsible carrier as claimed in claim 3 wherein said cross member is a crossbar that is disposed in spaced perpendicular relationship with said base, said crossbar having first and second ends.

5. The collapsible carrier as claimed in claim 4 wherein one of each said carrying arms is pivotally attached to one of each said ends of said crossbar.

6. The collapsible carrier as claimed in claim 1 including mounting means for mounting said frame to said base, said base fixedly attached to said mounting means, said lower end of said frame pivotally mounted to said mounting means, said frame pivotally movable relative to said base.

7. The collapsible carrier as claimed in claim 6 wherein said mounting means includes locking means for releasingly locking said frame and said base against relative movement.

8. The collapsible carrier as claimed in claim 7 wherein said locking means includes a first bracket, a second bracket and a locking pin, said first bracket mounted to said frame and said second bracket mounted to said mounting means, said locking pin mounted to one of said first and second brackets and configured to engage the other of said first and second brackets to hold said frame in said generally vertical position against movement relative to said base, said locking pin configured to disengage the other of said first and second bracket to permit pivoting movement of said frame relative to said base member.

9. A collapsible carrier detachably mountable to a trailer hitch receiver that is secured to a vehicle, said collapsible carrier comprising:

(a) a base that is sized and shaped to be detachably mounted to the trailer hitch receiver;

(b) a frame mounted to said base, said frame extending upwardly from said base in a substantially vertical position;

(c) a substantially T-shaped member having a substantially vertical body and a substantially horizontal cross member, said cross member attached to an upper end of said body, a lower end of said body operatively connected to said frame;

(d) a carrying assembly pivotally mounted to said cross member, said carrying assembly having a forwardly extending carrying means and a rearwardly extending bracket engaging member;

(e) a slide member slidably mounted on said body;

(f) a tab provided on said slide member;

(g) a bracket having first and second ends, said first end of said bracket pivotally mounted to said tab, said second end of said bracket pivotally mounted to said bracket engaging member; and (h) means for locking said slide member at first and second positions on said body, said carrying means in a substantially horizontal extended carrying position when said slide member is locked in said first position, said carrying means in a collapsed position when said slide member is locked in said second position.

10. The collapsible carrier as claimed in claim 9 wherein said carrying means is a pair of extending carrying arms and said carrying assembly is a substantially U-shaped member, said carrying arms forming an open end of said U-shaped carrying assembly, said bracket engaging member being positioned at a closed end of said U-shaped carrying assembly.

11. The collapsible carrier as claimed in claim 10 wherein said cross member is a crossbar that is disposed in spaced perpendicular relationship with said base, said crossbar having first and second ends.

12. The collapsible carrier as claimed in claim 11 wherein one of each said carrying arms is pivotally attached to one of each said ends of said crossbar.

13. The collapsible carrier as claimed in claim 9 including mounting means for mounting said frame to said base, said base fixedly attached to said mounting means, said frame pivotally mounted to said mounting means.

14. The collapsible carrier as claimed in claim 13 wherein said mounting means includes locking means for releasingly locking said frame and said base against relative movement.

15. The collapsible carrier as claimed in claim 14 wherein said locking means includes a first bracket, a second bracket and a locking pin, said first bracket mounted to said frame and said second bracket mounted to said mounting means, said locking pin mounted to one of said first and second brackets and configured to engage the other of said first and second brackets to hold said frame in said generally vertical position against movement relative to said base, said locking pin configured to disengage the other of said first and second bracket to permit pivoting movement of said frame relative to said base member.

16. The collapsible carrier as claimed in claim 9 including securing means operatively connected to said carrying means for securing an object positioned on said carrying means.

17. A collapsible carrier detachably mountable to a trailer hitch receiver that is secured to a vehicle, said collapsible carrier comprising:

(a) a base that is sized and shaped to be detachably mounted to the trailer hitch receiver;

(b) a frame mounted to said base, said frame extending upwardly from said base, said frame in a substantially vertical position;

(c) a substantially T-shaped member having a substantially vertical body and a substantially horizontal cross member, said cross member attached to an upper end of said body, said body slidably received within said frame;

(d) a carrying assembly pivotally mounted to said cross member, said carrying assembly having a pair of carrying arms at a forward end of said carrying assembly and bracket engaging member at a rearwardly end of said carrying assembly;

(e) a tab at an upper end of said frame;

(f) a bracket having first and second ends, said first end of said bracket pivotally mounted to said tab, said second end of said bracket pivotally mounted to said bracket engaging member; and (g) means for locking said body at first and second positions in said frame; said carrying arms in a substantially horizontal extended carrying position when said body is locked in said first position, said carrying arm in a collapsed position when said body is locked in said second position.

18. The collapsible carrier as claimed in claim 17 wherein said carrying assembly is a substantially U-shaped member, said carrying arms forming an open end of said U-shaped carrying assembly, said bracket engaging member being positioned at a closed end of said U-shaped carrying assembly.

19. The collapsible carrier as claimed in claim 18 wherein said cross member is a crossbar that is disposed in spaced perpendicular relationship with said base, said crossbar having first and second ends.

20. The collapsible carrier as claimed in claim 19 wherein one of each said carrying arms is pivotally attached to one of each said ends of said crossbar.

21. The collapsible carrier as claimed in claim 17 including mounting means operatively connected to said frame and said base, said base fixedly attached to said mounting means, said frame pivotally mounted to said mounting means.

22. The collapsible carrier as claimed in claim 21 wherein said mounting means includes locking means for releasingly locking said frame and said base against relative movement.

23. The collapsible carrier as claimed in claim 22 wherein said locking means includes a first bracket, a second bracket and a locking pin, said first bracket mounted to said frame and said second bracket mounted to said mounting means, said locking pin mounted to one of said first and second brackets and configured to engage the other of said first and second brackets to hold said frame in said generally vertical position against movement relative to said base member, said locking pin configured to disengage the other of said first and second bracket to permit pivoting movement of said frame relative to said base member.

* * * * *